Figure 1:
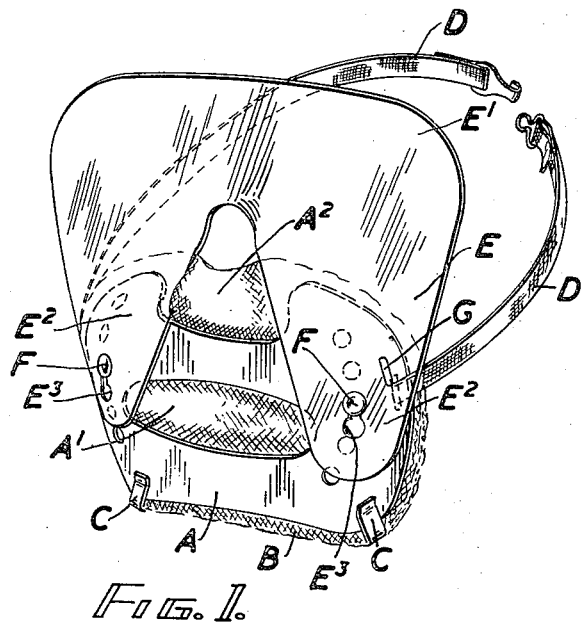

Sept. 11, 1956     H. G. BLOOMFIELD     2,762,368

RESPIRATORY MASKS

Filed Jan. 6, 1955

INVENTOR

HERBERT G. BLOOMFIELD

BY Watson, Cole, Grindle & Watson,
ATTORNEY

United States Patent Office 2,762,368
Patented Sept. 11, 1956

2,762,368

RESPIRATORY MASKS

Herbert George Bloomfield, London, England, assignor to Martindale Electric Company Limited, London, England, a British company Application January 6, 1955, Serial No. 480,133

Claims priority, application Great Britain January 22, 1954

9 Claims. (Cl. 128—146)

This invention relates to respiratory masks of the kind comprising a plate formed of thin ductile sheet metal, usually aluminium, having formed therein a mouth opening and having a central part of its upper edge cut away to provide a recess to receive the lower part of the wearer's nose while a pad of filtering material is detachably secured to the plate, usually by clips so as in use to be between the plate and wearer's face and to be maintained by the plate over the wearer's mouth and nostrils. The plate, which can be bent to suit the contours of the wearer's face, is usually held in place against the wearer's face by two elastic straps connected to opposite sides of the plate and arranged to be connected to one another, for example by a hook and eye connection, behind the wearer's head.

According to the present invention there is combined with a respiratory mask of the kind referred to an eye shield comprising a sheet of flexible transparent material having an upper part arranged to lie in front of the eyes of a wearer of the mask and two downwardly extending side portions arranged to extend downwards from the upper part on the sides of the wearer's nose and connected to the metal plate of the mask at points adjacent to the sides of this plate.

Preferably the eye shield is arranged to be readily attached to and detached from the metal plate so that masks of the kind referred to can at will either be used as hitherto without an eye shield or can have an eye shield attached thereto according to the present invention. Thus, in a convenient arrangement according to the invention the two side portions of the eye shield are connected to the plate of the mask by pins or eyelets which pass through the side portions of the eye shield and through the plate, the holes in the eye shield through which the pins or eyelets pass being in the form of keyhole slots or the like so that the pins or eyelets can readily be inserted into the enlarged portions of such slots and then slid into the narrower portions when the eye shield is to be attached to the mask or slid into the enlarged portions of the slots and withdrawn therefrom when the eye shield is to be removed from the mask.

Moreover the pins or eyelets may be formed of a flexible resilient rubber-like material so as to be capable of being inserted readily into appropriate holes in the plate and then retained therein by their resilience while also tending to grip the sides of the holes or slots in the eye shield when the latter is attached to the mask and thus prevent unintentional detachment of the eye shield from the mask.

According to a further feature of the invention the points of attachment of the eye shield to the plate, that is to say the distance apart of the holes or slots in the eye shield in the arrangement above described, before the eye shield is attached to the plate, is somewhat greater than the distance apart of the holes in the plate through which pass the eyelets or the like by which the eye shield is to be attached to the plate, so that, when the eye shield is attached to the plate the centre portion of its upper part is caused to bulge forwardly away from the plane of the plate and so as to lie at a convenient distance in front of the eyes of the wearer and follow, more or less, the contour of his forehead.

Masks of the kind referred to as at present made often have formed in the side portions of the plate about midway between the sides of the mouth opening and nose recess and the edges of the plate a number of holes and in one arrangement according to the invention two of such holes may be used to receive eyelets or the like by which the eye shield is connected to the plate.

The invention may be performed in various ways but one construction according to the invention is illustrated by way of example in the accompanying drawings.

Figure 2:
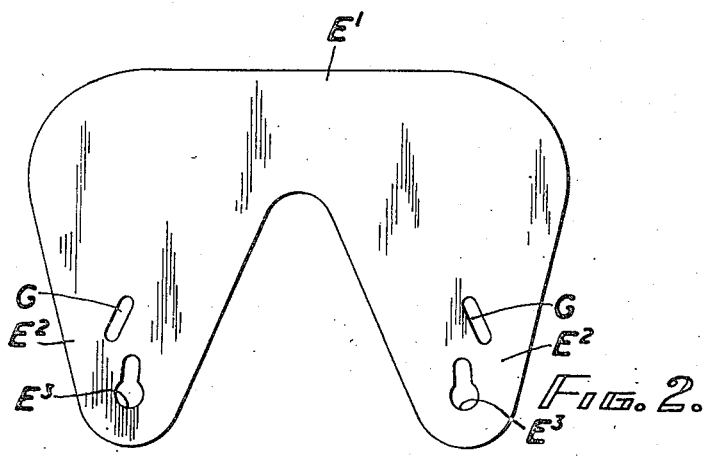

In the accompanying drawings:

Figure 1 is a perspective view of the eye shield attached in position on a suitable mask and Figure 2 is a plan view of the eye shield in its undistorted condition before attachment to the mask.

In the form of the invention illustrated A is the metal plate with a mouth opening at A1 and nose recess A2, B is the pad of filtering material, held in place before the mask is applied to the face of the wearer by clips C, D are elastic straps by which the mask is held in place against the face of the wearer, and E is the eye shield comprising an upper portion E1 and two downwardly extending side portions E2, each of which is provided with a vertical keyhole opening E3 engaged by an eyelet F of rubber-like material passing through a hole in the plate A, the centre lines of the keyhole openings E3 before their engagement by the eyelets F being spaced apart by a somewhat greater distance than the centres of the eyelets F so that, when the eye shield is attached to the plate A in the manner indicated the centre portion of the upper portion E1 of the eye shield bulges forward as shown.

The eye shield may in some cases have slots G as shown in Figure 2 through which the ends of the elastic straps may pass.

It is to be understood that the eye shield itself formed for attachment to an existing mask of the kind referred to is to be regarded as coming within the scope of the present invention.

What I claim as my invention and desire to secure by Letters Patent is:

1. A mask of the type comprising a plate formed of thin ductile sheet metal, having therein a mouth opening and having a central part of its upper edge cut away to provide a nose-receiving recess, a pad of filtering material detachably secured to the said plate and means for attaching the mask to a wearer, in combination with an eye shield comprising a sheet of flexible transparent material, having an upper part arranged to lie in front of the eyes of the wearer of the mask and two downwardly extending side portions arranged to extend downwards from the upper part on the sides of the wearer's nose and connected to the metal plate of the mask at points adjacent to the sides of the plate.

2. The combination of a mask and eye shield as claimed in claim 1 in which the two side portions of the eye shield are connected to the plate of the mask by pins or eyelets which pass through such side portions and through the plate.

3. The combination of a mask and eye shield as claimed in claim 2 in which the side portions of the eye shield are connected to the plate by eyelets formed of flexible rubber like material.

4. The combination of a mask and eye shield as claimed in claim 3 in which the eye shield is provided with keyhole shaped holes in which the pins or eyelets which connect the eye shield to the mask are located.

5. A mask of the type comprising a plate formed of thin ductile sheet metal, having therein a mouth opening and having a central part of its upper edge cut away to provide a nose-receiving recess a pad of filtering material detachably secured to the said plate and means for attaching the mask to a wearer, in combination with an eye shield comprising a sheet of flexible transparent material, having an upper part arranged to lie in front of the eyes of the wearer of the mask and two downwardly extending side portions arranged to extend downwards from the upper part on the sides of the wearer's nose in which are provided keyhole shaped holes in which pins or eyelets which act to connect the eye shield to the mask are located, the pins or eyelets also being connected to the metal plate of the mask at points adjacent to the sides of the plate.

6. A mask of the type comprising a plate formed of thin ductile sheet metal, having therein a mouth opening and having a central part of its upper edge cut away to provide a nose-receiving recess, a pad of filtering material detachably secured to the said plate and means for attaching the mask to a wearer, in combination with an eye shield comprising a sheet of flexible transparent material, having an upper part arranged to lie in front of the eyes of the wearer of the mask and two downwardly extending side portions arranged to extend downwards from the upper part on the sides of the wearer's nose and connected to the metal plate of the mask at points adjacent to the sides of the plate and in which the points of attachment of the side portions of the eye shield to the plate are, when the mask is flat before attachment to the plate, spaced apart slightly more widely than the points on the plate to which they are attached so that when the eye shield is attached to the plate the centre part of its upper portion is caused to bulge forwardly away from the plane of the plate so as to lie at a convenient distance in front of the eyes of the wearer.

7. The combination of a mask and eye shield as claimed in claim 6 in which the two side portions of the eye shield are provided with keyhole shaped holes which serve to receive in a detachable manner pins or eyelets which act to connect the mask to the eye shield.

8. An eye shield for use with a mask of the type comprising a plate formed of thin ductile material having therein a mouth opening and having a central part of its upper edge cut away to provide a nose receiving recess, a pad of material detachably secured to the said plate and means for attaching the mask to a wearer, the said eye shield comprising a sheet of flexible transparent material, having an upper part arranged to lie in front of the eyes of the wearer of a mask of the type referred to and two downwardly extending side portions arranged to extend downwards from the upper part on the sides of the wearer's nose and attachable to the metal plate of the mask at points adjacent to the sides of the plate.

9. An eye shield as claimed in claim 8 in which the downwardly extending side portions extending downwards from the upper part on the sides of the wearer's nose are provided with keyhole shaped holes for engagement with attachment pins or the like on the mask.

References Cited in the file of this patent

FOREIGN PATENTS 864,401    France _____ Jan. 17, 1941